Figure 1:
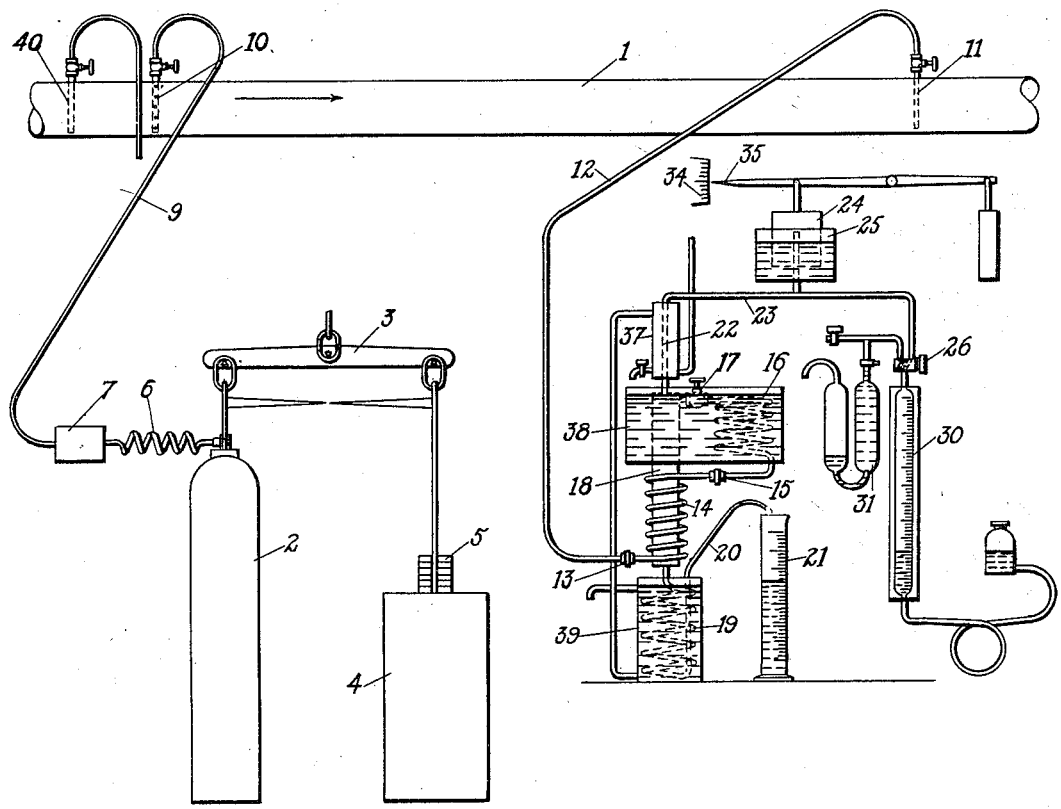

E. G. BAILEY.
METHOD FOR MEASURING THE RATE OF FLOW OF AQUEOUS FLUIDS.
APPLICATION FILED JULY 16, 1915. RENEWED OCT. 25, 1918.

1,299,540.

Patented Apr. 8, 1919.

Inventor:
Ervin G. Bailey,
by _____
Att'y.

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

METHOD FOR MEASURING THE RATE OF FLOW OF AQUEOUS FLUIDS.

1,299,540.  Specification of Letters Patent.  Patented Apr. 8, 1919.

Application filed July 16, 1915, Serial No. 40,238. Renewed October 25, 1918. Serial No. 259,714.

*To all whom it may concern:*

Be it known that I, ERVIN G. BAILEY, a citizen of the United States, residing in Newton Highlands, in the county of Middlesex and State of Massachusetts, have invented an Improvement in Methods for Measuring the Rate of Flow of Aqueous Fluids, of which the following description, in connection with the accompanying drawings, is a specification, like letters on the drawings representing like parts.

The present invention relates to a method of measuring the rate of flow of aqueous fluids in closed pipes and is adapted for test work and meter calibration where the actual weighing of water or condensate is impossible or too expensive. The purpose of the invention is to accurately measure the flow of aqueous fluids, such as steam or water or a mixture of them when flowing at an unknown rate through closed pipes or conduits under any conditions, whatever they may be. The method consists in adding or introducing at a known rate a gaseous fluid of suitable characteristics as hereinafter set forth to the aqueous fluid, then taking a sample of the fluid after the gaseous fluid has become mixed with or dissolved by the aqueous fluid and testing the sample to determine the proportion or ratio of one to the other.

The invention is intended for the use of measuring flowing steam, water, or a mixture of the two; and the term "aqueous fluid" is used to include steam, water, watery vapor, or water of condensation, whether mingled or not with flowing steam.

This invention is particularly useful for testing and verifying conditions in many places where it is impossible to determine by actual weight the steam consumption of engines, turbines, heating systems, manufacturing processes, etc., and where the installation of meters does not always remove the uncertainty as to the accuracy of measuring the rate of flow of steam, this being true in many cases where there is pulsating flow such as is due to reciprocating engines, pumps, etc., where there are extremely high or low velocities, or where the piping is complex so that the stream of flow is greatly disturbed. Under any of these conditions it is very desirable to check or calibrate such meters in place under regular operating conditions. Owing to the difficulty, and oftentimes the absolute impossibility of making such measurements and calibrations a very important field of engineering has not heretofore made the progress that it should have made. Similar conditions exist in the measurement of the flow of water in which weighing tests may require the putting in of large tanks and scales, or may involve expensive changes in the piping, and often an extra pump. With the present method, however, it is possible to measure the rate of flow of steam or water under any conditions with great accuracy and at little expense.

For the practical success of this method the gaseous fluid that is introduced should be miscible with the fluid, the rate of flow of which is to be measured, but should be chemically inert or without affinity therefor, and obviously it should be such as to have no detrimental effect on the fluid with which it is mixed, nor on the piping or appliances in which said fluid is used.

The term inert is to be understood as meaning not having an appreciable effect, chemical or otherwise, on the fluid the rate of flow of which is to be measured, and the term miscible as meaning capable of such intimate commingling as will result in substantial uniformity of proportion of the ingredients throughout the mixture.

Atmospheric air, or either of its principal gaseous components, or carbon dioxid, meets the requirements satisfactorily, but carbon dioxid possesses advantages over atmospheric air which outweigh the additional cost, said gas being inert, very readily miscible with steam or water, easily separable therefrom, and capable of being kept in liquid condition under moderate pressure at usual atmospheric temperatures, so that sufficient quantity can be had in a container of moderate size and strength, and the rate of delivery into the fluid to be metered can readily be determined by weight. There are also many ways of testing the sample of the mixture whereby the ratio of the aqueous fluid to the gaseous fluid may be determined, of which physical separation of the two and making volume or weight measurements, of each one separately, has been found to be most satisfactory.

For the purpose of describing and illustrating this method, I have chosen to describe the measurement of the flow of steam using carbon dioxid as the added gaseous fluid, and have shown two forms of apparatus which may be used.

Figure 2:
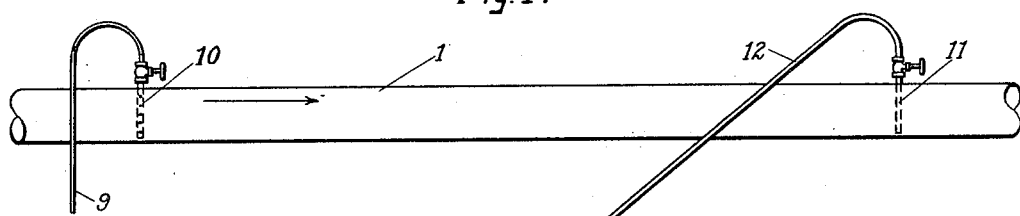
Figure 2:
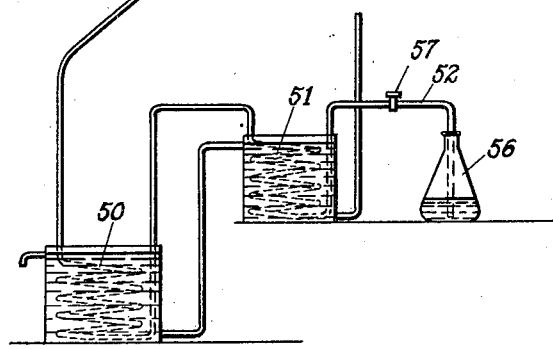

Figure 1 is a diagram view of an apparatus that may be used in carrying out the method; Fig. 2 is a modified form of apparatus, illustrating a different way of determining the ratio of the gaseous to the aqueous fluid.

Referring to Fig. 1, the method is employed to determine the rate of flow of steam through a pipe 1; and in accordance with the method, carbon dioxid is introduced at a known rate into the pipe 1 where it mingles with the steam; and after it has flowed through the pipe a sufficient distance to become thoroughly mixed, a representative sample is drawn from the pipe, and the aqueous and gaseous fluids are then separated and measured to determine the relative quantities of each.

In the construction chosen to illustrate the method, a tank 2 which contains carbon dioxid is suspended from a scale 3 which is shown as consisting of a beam having a weight 4 which partially balances the tank 2, and also having smaller weights 5 for adjusting and balancing the weight of the tank during the test. The gas from the tank 2 is introduced into the pipe 1, through flexible tubing 6 and a regulating governor or pressure reducing valve 7 so that the rate of flow of gas is predetermined and constant. I have shown the tube 9, through which the gas enters the pipe 1, as provided with a perforated nozzle 10 in order to facilitate the perfect mixture of the gas and steam, but this is not essential, especially in cases where there are fittings and bends in the pipe line between the point where the gas is introduced and the point where the sample is taken out.

For the purpose of removing and testing a sample of the mixture in order to determine the ratio of one ingredient to the other, I have shown the pipe 11 as extending into the pipe 1, through which a sample of the mixed steam and gas passes, thence through tubing 12, and the coil 14, to a cooling coil 16 in which the steam is condensed. The sample then discharges into a separating chamber 18 and the condensed steam accumulates in the lower part of the chamber 18 where it is thoroughly boiled by means of the heat from the steam in the sample as it passes through the coil 14. This boiling thoroughly expels all gas from the condensed steam of the sample, and the gas thus separated passes up through pipe 22 which has a cooling jacket 37 and thence through pipe 23 to gasometer 24 which is shown as a bell sealed by a liquid contained in a vessel 25. The water flows from the separating chamber 18 through cooling coil 19 and tube 20 into a measuring vessel 21 where it accumulates while the sample is being taken. The rate of flow of the sample is continuous and substantially constant and is controlled by means of the regulating valve 17; and after a certain interval of time simultaneous measurements are taken of the gas and water, respectively. By reducing these measurements to a weight basis, the ratio of gas to water may be determined and when this ratio is multiplied by the rate at which the gas is being introduced to the steam line from the tank 2 during the same period, the product is the rate of flow of steam through the pipe during this period.

The gasometer is shown as provided with a scale 34 and a pointer 35 so that the measurements of the gas can be taken in this way. I have, however, also shown the apparatus as provided with a measuring burette 30 into which the amount of gas accumulated in the gasometer may be drawn until the pointer 35 comes to a predetermined position, thereby showing the amount of gas which has been accumulated during a given period.

There is a small amount of air, and usually some carbon dioxid, originally in the water or steam being measured, but it is possible to add the gaseous fluid or carbon dioxid to the steam line from tank 2 at such a high rate that the original amount of such gas in the water or steam will be an insignificant percentage and its presence will, therefore, cause no appreciable inaccuracy in the final results; or if it is not desirable to add enough gas to make the original amount negligible, a test can be made to determine the actual amount of air, carbon dioxid, or other gases originally in the steam or water and a suitable allowance made in the total volume of gas or water obtained from the sample after adding the gas during the regular test. In most cases the ratio of initial gas in the steam or water is so nearly constant that a blank determination can be made before or after a test and this determination applied as a correction during a test with sufficient accuracy. In other cases, however, where the initial amount of such gas is likely to vary, a determination of this gas can be made continuously during the same time that the test is being made by drawing a sample from pipe 40 located in the steam line ahead of gas inlet pipe 10, this sample being treated in a similar manner to the sample drawn out through pipe 11, thereby determining the ratio of initial gas to steam for the purpose of allowing for this original gas content.

It is frequently desirable to check the amount of carbon dioxid gas added to the steam or water by separating it from the residual gas which is usually largely air, by making absorption of the carbon dioxid in the absorption pipe 31. It is obvious, however, that this process can be carried on without the necessity of knowing the chemical properties of the gas at all and in reality it is not necessary to separate the carbon dioxid from the air by absorption of the former. This method can be carried out if air or any other suitable inert miscible gas is added to the steam line at a known rate from any source, without departing from the method as set forth.

Another way to test the sample and determine the ratio of steam to carbon dioxid gas is illustrated in Fig. 2. In this case the sample containing the mixture of the two fluids comes through a sampling tube such as 11 in Fig. 1 through tubing 12 into the condensing coil 50 and thence through a cooling coil 51 and discharges through tubing 52 into a flask 56, the rate of flow of the sample being controlled by a valve 57. The carbon dioxid added to the steam needs to be only a very small amount, such for instance as one pound of carbon dioxid to from 2,000 to 4,000 pounds of steam. Under these conditions the carbon dioxid will be held in the cooled sample in solution as carbonic acid, the amount of which can be ascertained by chemical titration, using a standard reacting solution such as sodium carbonate and a suitable indicator. In the case of hot water it would be necessary only to have a cooling medium around the part of the tube conveying the sample from the pipe line to the collecting vessel and in the case of cold water the sample could go directly from the pipe line to the collecting flask 56.

It is obvious that the method is not dependent upon any particular type of apparatus, it only being necessary to add or generate a suitable inert miscible gaseous fluid to be mixed with the aqueous fluid at a known rate, and take a sample which is tested to determine the ratio of water or condensate to the gas. The mathematical product of this ratio and the rate of adding the gas, expressed in suitable units such as pounds per hour, will give the rate of flow of the aqueous fluid in terms of the same units.

What I claim is:—

1. A method of measuring the rate of flow of aqueous fluid which consists in adding at a known rate to the flowing aqueous fluid an inert gaseous fluid miscible with said aqueous fluid, and testing the resulting mixture to determine the ratio of aqueous fluid to the gaseous fluid added to it that exists in said mixture.

2. A method of measuring the rate of flow of aqueous fluid which consists in adding at a known rate to the flowing aqueous fluid an inert gaseous fluid miscible with said aqueous fluid; taking a representative sample of the mixed gaseous and aqueous fluid; and making a physical separation of said aqueous and gaseous fluid contained in the mixture to ascertain the relative proportions thereof.

3. A method of measuring the rate of flow of aqueous fluids which consists in adding carbon dioxid gas at a known rate to the flowing aqueous fluid and testing the resulting mixture to determine the ratio of aqueous fluid to carbon dioxid gas.

4. A method of measuring the rate of flow of aqueous fluids in closed conduits, which consists in adding carbon dioxid gas at a known rate to the flowing aqueous fluid being measured; conducting a representative sample of the mixture from the conduit; making a physical separation of the carbon dioxid gas from the aqueous fluid; and measuring the carbon dioxid gas and the aqueous fluid respectively whereby the ratio of one to the other may be determined.

5. A method of measuring the rate of flow of steam through a pipe, which method consists in adding to the steam carbon dioxid gas at a known rate, and subsequently taking a sample of the steam and testing said sample to determine the ratio of steam to carbon dioxid.

In testimony whereof, I have signed my name to this specification.

ERVIN G. BAILEY.